July 24, 1956  W. P. CARR  2,755,761
PIPE TOOL

Filed May 28, 1953  2 Sheets-Sheet 1

Willie P. Carr
INVENTOR.

July 24, 1956 W. P. CARR 2,755,761
PIPE TOOL

Filed May 28, 1953 2 Sheets-Sheet 2

Willie P. Carr
INVENTOR.

BY Clarence A. O'Brien
and Harvey B. Jacobson
Attorneys

United States Patent Office 2,755,761
Patented July 24, 1956

2,755,761
PIPE TOOL
Willie P. Carr, Washington, N. C.
Application May 28, 1953, Serial No. 358,109
1 Claim. (Cl. 113—111)

This invention relates generally to mechanism for facilitating the welding of pipe and pertains more particularly to a tool capable of pretensioning pipe members to prevent subsequent deformation thereof during welding operations.

A primary object of this invention is to provide an improved tool of simple and economical manufacture and which is yet fully effective to produce the desired result.

Another object of this invention resides in the provision of a pipe tool incorporating means for resisting deformation of pipe during welding operations thereon, such means including members adapted to engage at space points along pipe to be welded, the members being physically interconnected to pretension pipe in a desired manner.

Another object of this invention is to provide an improved form of pipe tool which includes a pressure bar adapted to engage a pipe surface at one end and adjustably carrying at its other end tension members adapted to be secured at their free end to pipe at points spaced oppositely from the portion engaged by the pressure member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
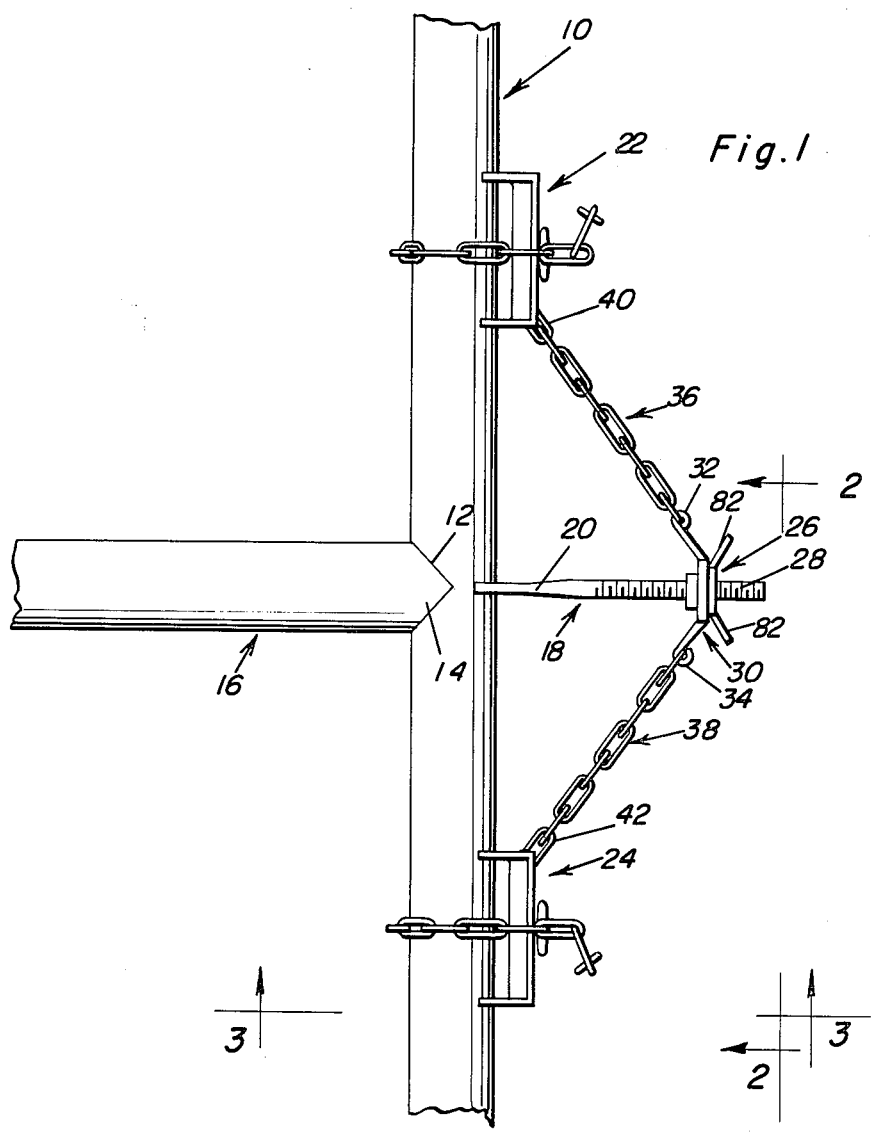
Figure 1 is a plan view showing the novel pipe tool in one manner of position during its operation.
Figure 2:
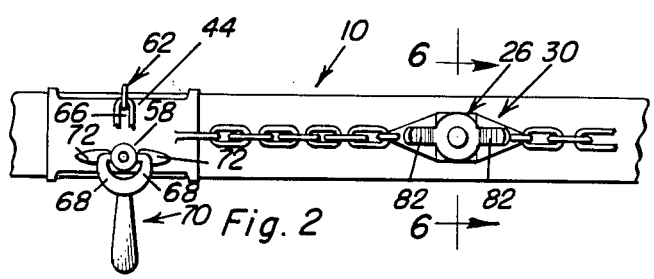
Figure 2 is an elevational view taken substantially along the plane indicated by the section line 2—2 in Figure 1.
Figure 3:
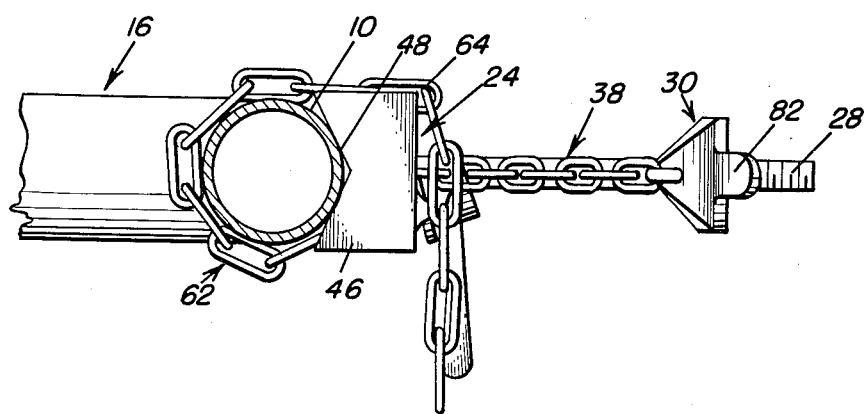
Figure 3 is a transverse sectional view taken along the plane of section line 3—3 of Figure 1 showing details and a portion of the tool on enlarged scale.
Figure 4:
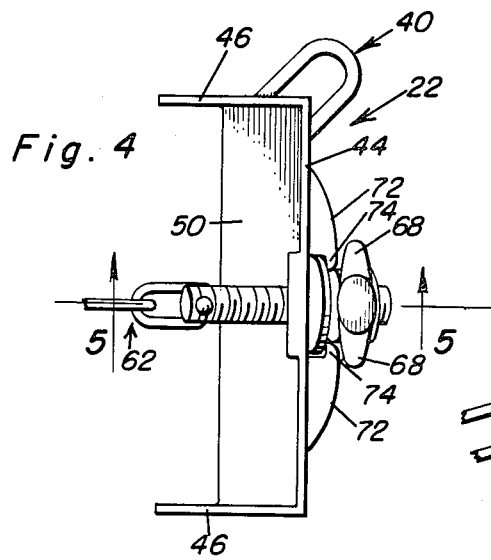
Figure 4 is an enlarged view showing one of the anchor members.
Figure 5:
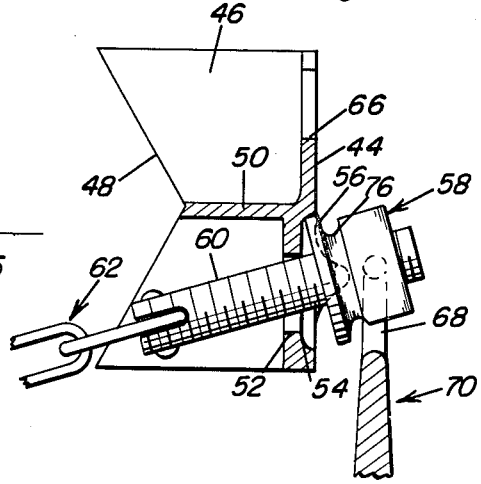
Figure 5 is a transverse section taken substantially along the plane of section line 5—5 of Figure 4 showing details of the anchor member.

Referring now more particularly to Figure 1, reference numeral 10 indicates generally a section of pipe which has been notched at 12 to receive the tapered end 14 of an abutting pipe section 16 which is desired to be welded to the main section 10. Ordinarily, the two sections might be merely placed in proper position and the welding operation performed, but this would ultimately result in the pipe section 10 bowing toward the section 16, which deformation is objectionable for obvious reasons.

To obviate the deformation due to the expansion and contraction of the metal resulting from the welding operation, a pressure bar indicated generally by the reference character 18 is placed with its bifurcated foot portion 20 against the surface of the pipe section 10 diametrically opposite the main portion of the pipe which is to be welded and the anchor members indicated generally by the reference characters 22 and 24 are clampingly secured to the pipe section 10 at points on either side of the portion engaged by the pressure bar 18. A nut member indicated generally by the reference character 26 is engaged upon the threaded intermediate end portion 28 of the pressure member and this nut carries a bracket member indicated generally by the reference character 30 whose opposite free ends are looped as at 32 and 34 to provide eyes for the reception of end links of the chain members 36 and 38, the opposite end of which chain members are attached to the links 40 and 42 rigidly secured to the anchor means. By manually turning the nut member in a direction to engage it along the pressure bar in a direction away from the pipe section 10, this section can be pretensioned so as to prevent subsequent deformation of the section during and after the welding operation is performed.

Referring now more particularly to Figures 2–5, it will be seen that each of the anchor members include a main body portion in the form of a plate 44, which is provided at its opposite ends with laterally projecting flanges 46, each of which is provided with a V-notch at its free edge as indicated by the reference numeral 48 for engaging most advantageously against the outer surface of an associated pipe section. A centrally disposed reinforcing web may be provided to extend between the end flanges. Midway between the end flanges, to one side of the reinforcing web 50 is provided an aperture 52 terminating in the outer surface of the plate member 44 in the enlarged recess 54 which receives the radial flange 56 of the nut 58. This nut is engaged on the threaded stud member 60 which extends through the aperture 52 and whose free end portion is suitably secured to a length of chain indicated by the reference numeral 62, which chain is adapted to extend around a section of associated pipe, with an intermediate one of its lengths 64 engaged within a notch 66 provided in the side edge of the plate 44 opposite the aperture 52, see particularly Figure 3. The main body portion of the nut 58 is provided with radially inwardly projecting recesses which receive the laterally bent free ends of the leg members 68, formed by the bifurcation at the end of the handle member 70, the handle member aiding in manipulation of the nut 58 to tighten the chain member thereto. The outer surface of the plate member 44 is provided with the raised boss at 72 having the ear portions 74 disposed in space relation with the enlarged recess 54 serving to prevent accidental disengagement of the nut member 58 from this groove, it being noted in this respect that these ears project inwardly within the annular groove 76 formed in the main body portion of the nut adjacent the collar 76.

It will be noted that one end of each of the anchor means is provided with one of the previously mentioned links or eyes 40 or 42 and that these members receive the free end portion of the flexible tension members 36 and 38 which preferably take the form of short lengths of chain.

Figure 6:
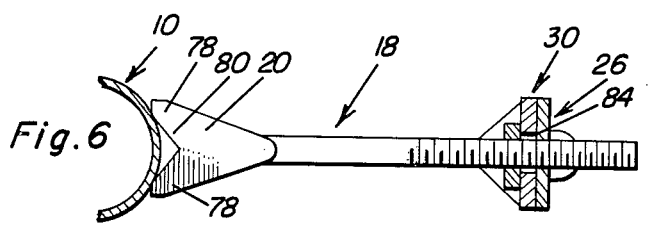
Figure 6 is a transverse sectional view taken substantially along the plane of section line 6—6 of Figure 2 showing details of the pressure bar assembly.

Referring now more particularly to Figures 1 and 6, it will be seen that the pressure bar 18 is preferably flat at its end portion 20 which is bifurcated to provide the spaced legs 78 having the V-notch 80 therebetween for engaging in the surface of an associated pipe section such as that indicated by the reference numeral 10 and it will be further noted that the previously described nut member 26 has laterally extending angular handle portions 82 for aiding in its manipulation and that this nut is provided with an annular groove 84 which receives the apertured central portion of the bracket member 30. It will be manifest that as the nut member 26 is threadedly engaged toward the free end of the pressure bar 18, the chain sections 36 and 38 will be tightened to pretension that portion of the pipe section between the anchor members 22 and 24, thus preventing subsequent deformation of this section of the pipe during a welding operation performed between the two sections 10 and 16.

It will be appreciated that the manner of utilizing the tool herein shown and described is not necessarily limited to a straight section of pipe as shown, but may be utilized in connection with angularly disposed sections of pipe or for that matter any configuration of pipe to which the tool may be fitted. Moreover, the particular diameter of pipe with which the tool is to be used is not critical in any way, inasmuch as the V-notched portions in the anchor members and the pressure foot will fit a wide variety of pipe diameters for any given particular dimension of such notches.

From the foregoing, the construction and operation of the device will be readily understood and further explanation is believed to be unnecessary. However, since numerous modifications and changes will readily occur to those skilled in the art it is not desired to limit the invention to the exact construction shown and described, and accordingly all suitable modifications and equivalents may be resorted to, falling within the scope of the appended claim.

What is claimed as new is as follows:

A tool for pre-tensioning a pipe section during welding comprising a pair of elongated anchor members adapted to be engaged at spaced points on a pipe section to be welded, threaded stud members slidably extending centrally through said anchor members, chains attached at one end to said stud members and attachable to said anchor members in surrounding relation to a pipe section, circumferentially grooved annular nuts on said stud members for turning against said anchor member to tighten said chains and clampingly engaging said anchor members with a pipe section, pairs of lugs on said anchor members between which said annular nuts are rotatable and having ears engaging said grooves and holding said nuts engaged with said anchor members, an elongated presser member engageable at one end with a pipe section between said anchor members and having a circumferentially grooved nut threaded on its other end, an angular bracket rotatably confined between its ends in said groove for feeding along said presser member by turning of said last named nut, and tension chains connected to opposite ends of said bracket and to said anchor members for tightening by feed of said bracket member.

References Cited in the file of this patent

UNITED STATES PATENTS

| | | |
|---|---|---|
| 906,727 | Levier | Dec. 15, 1908 |
| 1,139,878 | McElroy | May 18, 1915 |
| 1,342,564 | Morris | June 8, 1920 |
| 1,467,722 | Frye | Sept. 11, 1923 |
| 1,781,592 | Meier | Nov. 11, 1930 |
| 1,847,943 | Griffin | Mar. 1, 1932 |
| 1,879,979 | Countryman | Sept. 27, 1932 |
| 1,940,910 | Hickey | Dec. 26, 1933 |
| 2,387,154 | Kalwitz | Oct. 16, 1945 |
| 2,492,491 | McCalla | Dec. 27, 1949 |

OTHER REFERENCES

Welding Handbook, 1942 edition, pages 41–43. Published by American Welding Society, New York, N. Y.